United States Patent
Aiello (10) Patent No.: US 10,458,265 B2
(45) Date of Patent: Oct. 29, 2019

(54) INTEGRALLY BLADED ROTOR

(71) Applicant: United Technologies Corporation, Hartford, CT (US)

(72) Inventor: Nicholas Aiello, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 468 days.

(21) Appl. No.: 14/783,925

(22) PCT Filed: Mar. 19, 2014

(86) PCT No.: PCT/US2014/031163
§ 371 (c)(1),
(2) Date: Oct. 12, 2015

(87) PCT Pub. No.: WO2014/168743
PCT Pub. Date: Oct. 16, 2014

(65) Prior Publication Data
US 2016/0069203 A1  Mar. 10, 2016

Related U.S. Application Data

(60) Provisional application No. 61/811,153, filed on Apr. 12, 2013.

(51) Int. Cl.
*F01D 11/00* (2006.01)
*F01D 5/34* (2006.01)
(Continued)

(52) U.S. Cl.
CPC .............. *F01D 11/006* (2013.01); *F01D 5/02* (2013.01); *F01D 5/3007* (2013.01); *F01D 5/34* (2013.01);
(Continued)

(58) Field of Classification Search
CPC .... F01D 11/006; F01D 11/005; F01D 5/3007; F01D 5/02; F01D 5/34; F04D 29/329; F04D 29/322
(Continued)

(56) References Cited

U.S. PATENT DOCUMENTS

| 3,847,506 A | 11/1974 | Straniti |
| 4,047,837 A | 9/1977 | Hueber et al. |

(Continued)

FOREIGN PATENT DOCUMENTS

| EP | 2520764 | 11/2012 |
| EP | 2520768 | 11/2012 |

OTHER PUBLICATIONS

Supplementary European Search Report for Application No. 14783310.7 dated May 20, 2016.

(Continued)

*Primary Examiner* — Christopher Verdier
*Assistant Examiner* — Michael L Sehn
(74) *Attorney, Agent, or Firm* — Carlson, Gaskey & Olds, P.C.

(57) ABSTRACT

An integrally bladed rotor for a gas turbine engine according to an exemplary aspect of the present disclosure includes, among other things, a radially inner hoop extending circumferentially about an axis, a plurality of circumferentially spaced, axially extending slots, separated by respective blade supports, and a seal system that includes seal fingers extending axially through the slots.

21 Claims, 5 Drawing Sheets

(51) Int. Cl.
   *F01D 5/02* (2006.01)
   *F01D 5/30* (2006.01)
   *F04D 29/32* (2006.01)
(52) U.S. Cl.
   CPC .......... *F04D 29/322* (2013.01); *F04D 29/329* (2013.01); *F05D 2220/32* (2013.01); *F05D 2240/20* (2013.01); *F05D 2240/55* (2013.01); *F05D 2260/941* (2013.01); *Y02T 50/671* (2013.01)
(58) Field of Classification Search
   USPC ........................................................ 416/234
   See application file for complete search history.

(56) References Cited

U.S. PATENT DOCUMENTS

| | | | |
|---|---|---|---|
| 4,326,835 A * | 4/1982 | Wertz | F01D 5/22 |
| | | | 416/193 A |
| 4,536,932 A | 8/1985 | Athey | |
| 4,875,830 A | 10/1989 | Trousdell et al. | |
| 5,632,600 A | 5/1997 | Hull | |
| 5,988,980 A | 11/1999 | Busbey et al. | |
| 8,157,514 B2 | 4/2012 | Reyes et al. | |
| 8,944,762 B2 * | 2/2015 | Suciu | F01D 5/066 |
| | | | 416/198 A |
| 2008/0304972 A1 | 12/2008 | Xiao | |
| 2011/0182745 A1 | 7/2011 | Suciu et al. | |
| 2011/0255991 A1 * | 10/2011 | Borufka | F01D 5/082 |
| | | | 416/97 R |
| 2012/0308381 A1 | 12/2012 | Suciu et al. | |

OTHER PUBLICATIONS

International Search Report and Written Opinion for Application No. PCT/2014/031163 dated Jul. 24, 2014.
The International Preliminary Report on Patentability for PCT Application No. PCT/US2014/031163, dated Oct. 22, 2015.

* cited by examiner

INTEGRALLY BLADED ROTOR

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor section and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low spool. A direct drive gas turbine engine includes a fan section driven by the low spool such that the low pressure compressor, low pressure turbine, and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Individual fan blades are mounted within a hub or rotor driven by the gear assembly. The configuration and geometry of the fan blades balance propulsive efficiency with durability and fatigue requirements.

Although geared architectures have improved propulsive efficiency, turbine engine manufacturers continue to seek further improvements to engine performance including improvements to thermal transfer and propulsive efficiencies.

SUMMARY

An integrally bladed rotor for a gas turbine engine according to an exemplary aspect of the present disclosure includes, among other things, a radially inner hoop extending circumferentially about an axis, a plurality of circumferentially spaced, axially extending slots, separated by respective blade supports, and a seal system that includes seal fingers extending axially through the slots.

In a further non-limiting embodiment of the foregoing integrally bladed rotor, the radially inner hoop is circumferentially continuous about the axis.

In a further non-limiting embodiment of any of the foregoing integrally bladed rotors, the seal system is an annual ladder seal.

In a further non-limiting embodiment of any of the foregoing integrally bladed rotors, a radially extending flange of the seal system to contact a hub of a gas turbine engine.

In a further non-limiting embodiment of any of the foregoing integrally bladed rotors, the seal fingers are configured to contact an annular wire seal.

In a further non-limiting embodiment of any of the foregoing integrally bladed rotors, the slots have a keyhole profile.

In a further non-limiting embodiment of any of the foregoing integrally bladed rotors, the slots include a first area near the axis and second area extending radially outward from the first area, the first area being circumferentially enlarged relative to the second area, the seal fingers disposed within the slot exclusively within the first area.

In a further non-limiting embodiment of any of the foregoing integrally bladed rotors, the first area has a rounded profile and the second area has a polygonal profile.

In a further non-limiting embodiment of any of the foregoing integrally bladed rotors, the second area is a keyhole opening.

In a further non-limiting embodiment of any of the foregoing integrally bladed rotors, radially inner surfaces of the plurality of slots have a radially inward arcing radius that at least partially defines an outer radius of the radially inner hoop, the radially inward arcing radius to distribute thermomechanical fatigue between the radially inner surfaces and tangent corner transition radii.

A gas turbine engine assembly having an integrally bladed rotor according to another exemplary aspect of the present invention includes, among other things, a radially inner hoop extending circumferentially about an axis, a plurality of circumferentially spaced, axially extending slots, separated by respective blade supports, and a ladder seal having a portion disposed within more than one of the plurality of slots.

In a further non-limiting embodiment of the foregoing gas turbine engine assembly, the integrally bladed rotor is positioned at an aftmost stage of a compressor section.

In a further non-limiting embodiment of any of the foregoing gas turbine engine assemblies, the integrally bladed rotor is within a geared gas turbine engine.

In a further non-limiting embodiment of any of the foregoing gas turbine engine assemblies, the ladder seal has a plurality of fingers each extending axially through a circumferentially enlarged area of one of the plurality of slots.

In a further non-limiting embodiment of any of the foregoing gas turbine engine assemblies, the engine includes a radially extending flange to connect one end of the plurality of fingers, the radially extending flange contacting a hub of the gas turbine engine that is upstream from the integrally bladed rotor relative to a direction of flow through the gas turbine engine.

In a further non-limiting embodiment of any of the foregoing gas turbine engine assemblies, the engine includes an annular wire seal held by a hub that is downstream from the integrally bladed rotor relative to the direction of flow through the gas turbine engine, wherein ends of the plurality of fingers that are opposite the radially extending flange contacting the annular wire seal.

In a further non-limiting embodiment of any of the foregoing gas turbine engine assemblies, the slots have a keyhole profile.

In a further non-limiting embodiment of any of the foregoing gas turbine engine assemblies, the slots include a first area near the axis and second area extending radially outward from the first area, the first area being circumferentially enlarged relative to the second area, the seal positioned within the circumferentially enlarged area.

A method of manufacturing a integrally bladed rotor, according to yet another exemplary aspect of the present disclosure includes, among other things, providing a radially inner hoop extending circumferentially about an axis, and a plurality of circumferentially spaced, axially extending slots, separating respective blade supports, and sealing more than one of the slots using a single seal.

In a further non-limiting embodiment of the foregoing method, the slots are keyhole slots comprising a keyhole opening.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
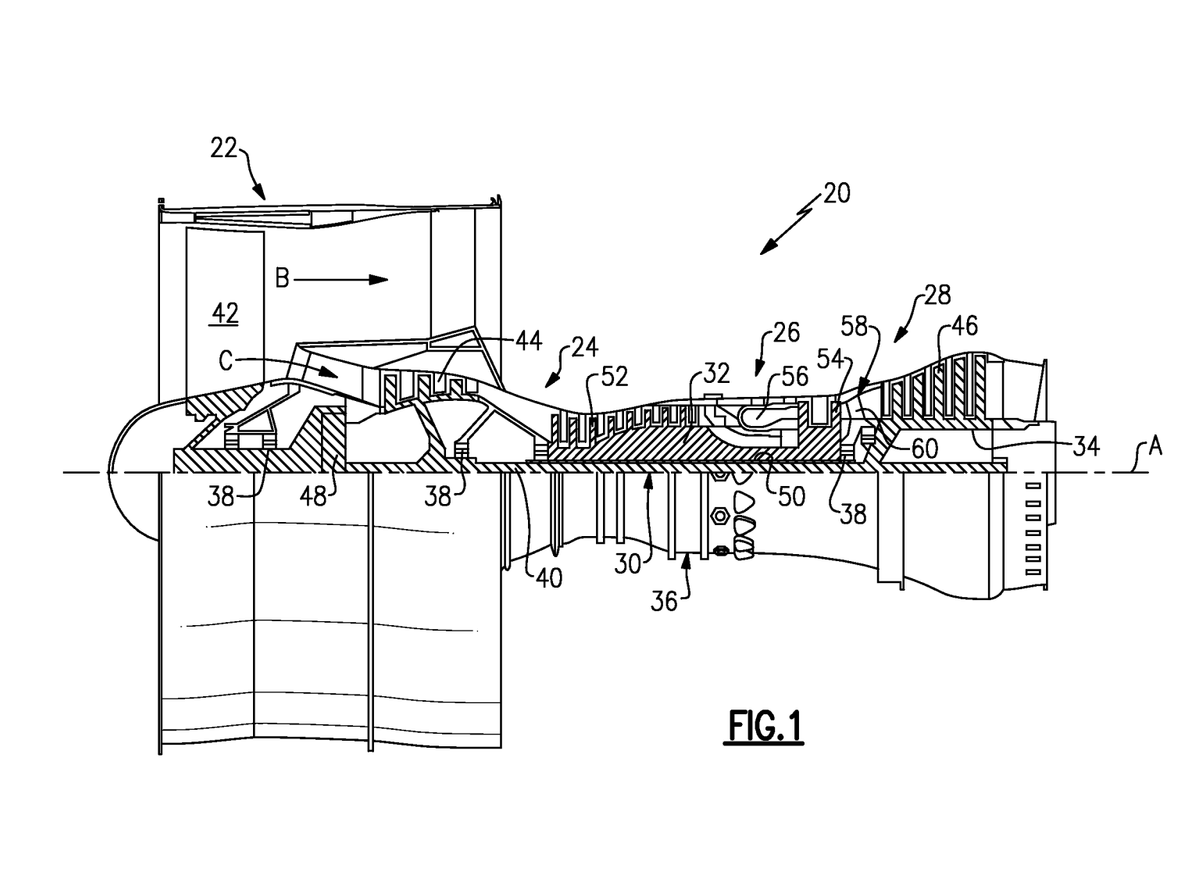
FIG. 1 schematically illustrates an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring to FIGS. 2-8 with continuing reference to FIG. 1, an assembly 64 of the high-pressure compressor 52 includes a forward hub 68, an aft hub 72, and an integrally bladed rotor 76, positioned therebetween. The example assembly 64 is within an aftmost stage of the high-pressure compressor 52 relative to a direction of flow through the engine. The assembly 64 may be located in other areas of the engine 20 in other examples.

Figure 2:
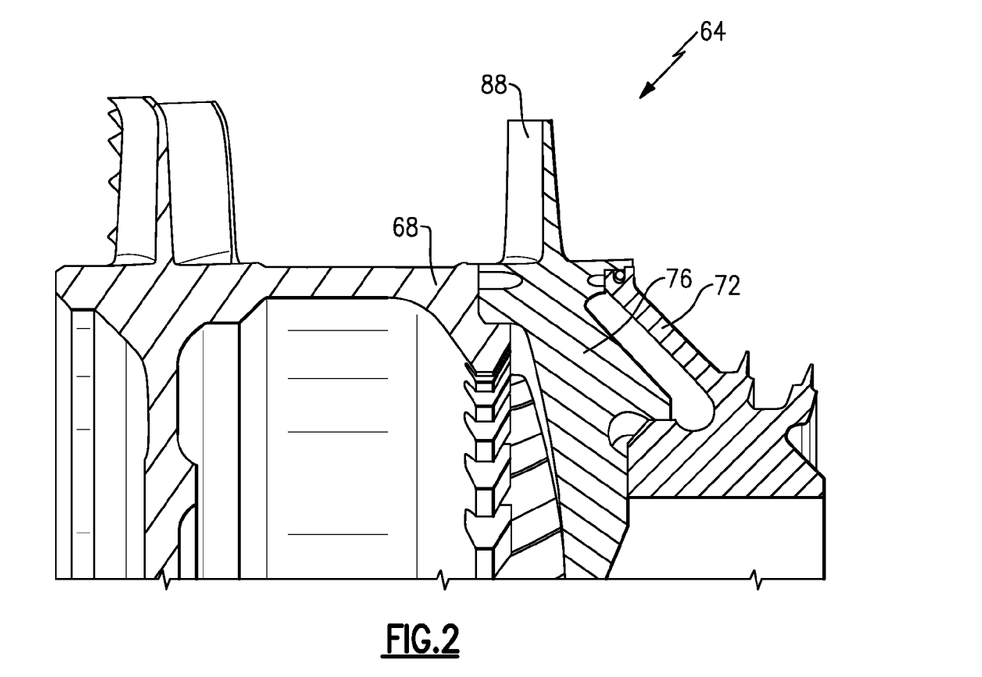
FIG. 2 illustrates a section view of an assembly within a compressor section of the gas turbine engine of the FIG. 1.
Figure 3:
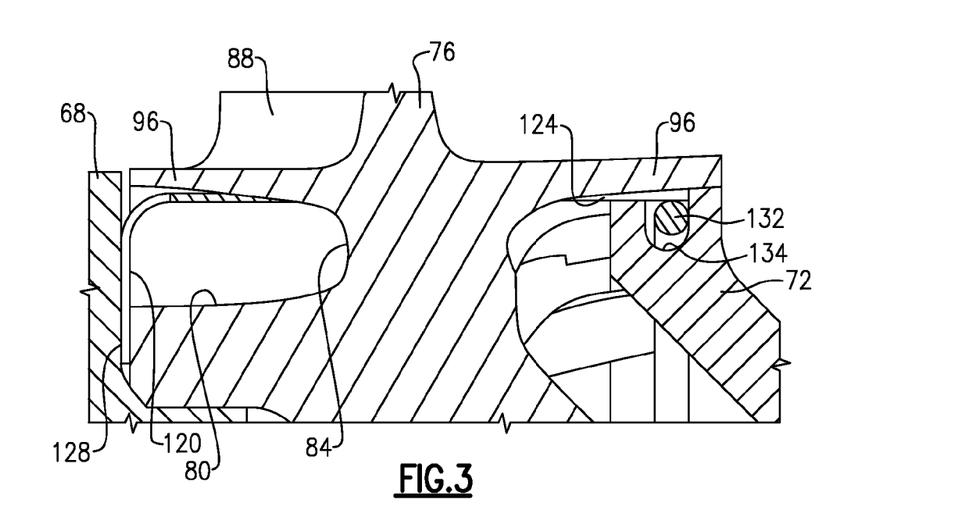
FIG. 3 is a close-up view of a portion of FIG. 2.
Figure 4:
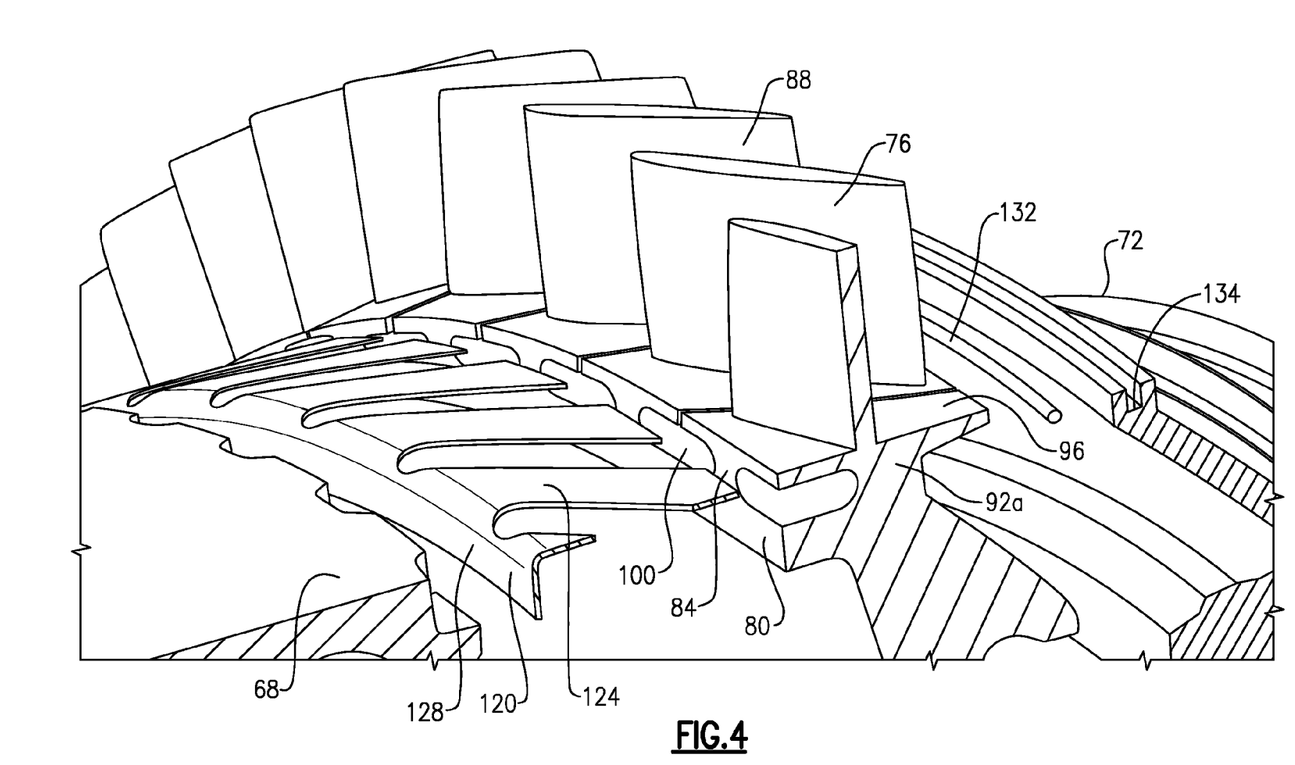
FIG. 4 is an exploded view of the portion of FIG. 3.

According to the disclosed embodiments, the integrally bladed rotor 76, which typically experiences hoop stresses, includes features that reduce hoop stress. The example integrally bladed rotor 76 includes a radially inner hoop 80, a plurality of blade supports 84, and blades 88 distributed about the axis A. The blade supports 84 each include a stem 92 and a platform 96. The stems 92a, 92b, etc., extend radially from the radially inner hoop section 80 to the platforms 96, which support the blades 88. Each of the example supports 84 is essentially completely separated from a circumferentially adjacent one of the supports by a slot 100. The radially inner hoop 80 is a full hoop section in this example.

Alternatively, only selected ones of the supports 84 are separated by respective slots 100.

The radially inner hoop section 80 is circumferentially continuous about the axis A. The slots 100 circumferentially space the supports 84 from one another. Accordingly, the hoop stresses in the integrated rotor are concentrated in the radially inner hoop 80 rather than the supports 84.

Figure 5:
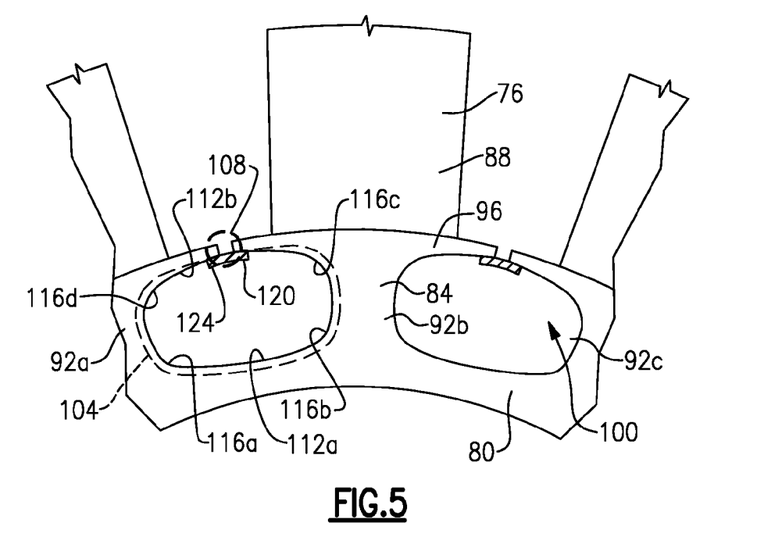
FIG. 5 illustrates two slots of the integrally bladed rotor of FIG. 4.
Figure 6:
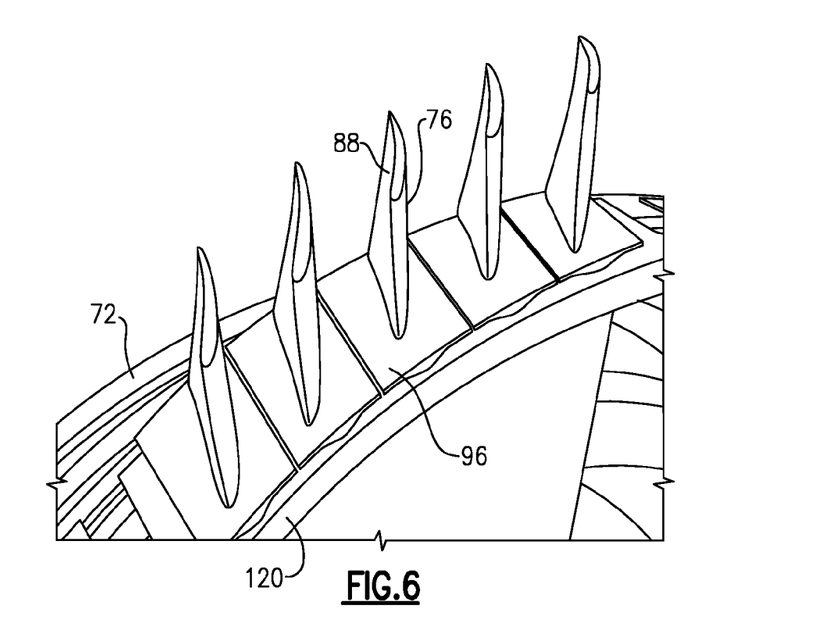
FIG. 6 illustrates a front view of selected portions of the assembly of FIG. 2.
Figure 7:
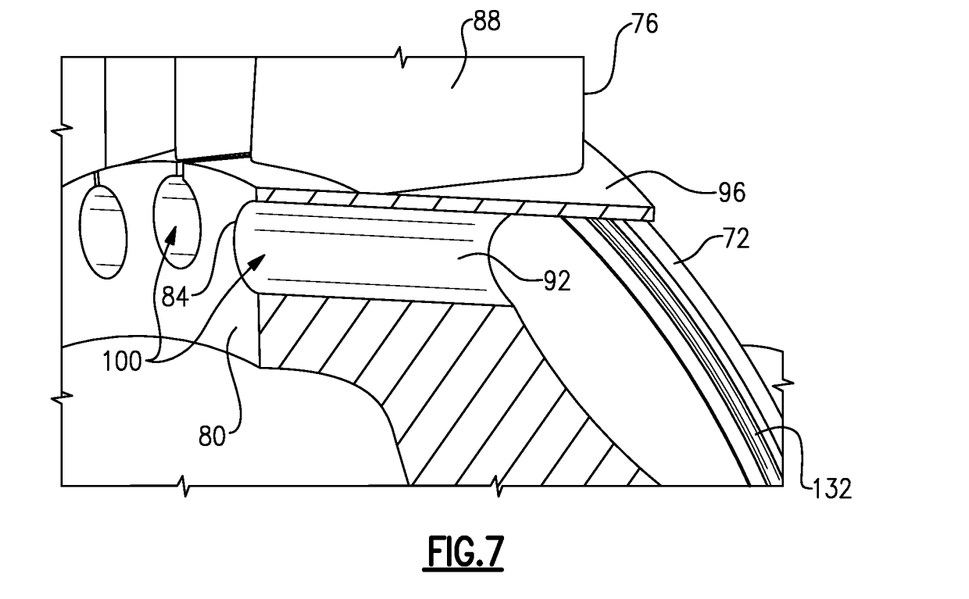
FIG. 7 illustrates a section view of selected portions of the assembly of FIG. 2.

Generally, the example slots 100 extend in the axial direction and have a keyhole profile. A first area 104 of the example slots 100 is circumferentially enlarged relative to a second area 108 of the slots. In this example, the first area 104 has a rounded profile and the second area 108 has a polygonal profile. The first area 104 may have a circular profile in some examples and is illustrated as having fillet style edge corners. The first area 104 is at a radially inner portion of the slot 100, and the second area is at a radially outer portion of the slot 100. The second area 108 may be considered a keyhole opening portion of the slot 100.

In this example, the first area 104 is positioned radially inside the platforms 96, and the second area 108 is radially aligned with the platforms 96. The slots 100 each have a radially inner surface 112a and a radially outer surface 112b. The radially inner surface 112a establishes the radially outer boundary of the radially inner hoop 80, and may be a radially inward arcing radius. The radially inward facing surfaces of the platforms 96 provide the radially outer surface 112b.

Corners 116a and 116b of the first area 104 represent a transition from the radially inner surface 112a, to the stems 92 of the supports 84. The corners 116a and 116b may be radiused to reduce stress concentrations near the interface of the supports 84 and the radially inner hoop 80.

Corners 116c and 116d of the first area 104 represent a transition from the stems 92 to the platforms 96. The corners 116c and 116d also may be radiused. Corners 116a and 116d as well as corners 116b and 116c may be a single continuous radius.

Thermomechanical fatigue in the example integrally bladed rotor 76 is concentrated in the rounded corners 116a and 116b and/or inner slot surface 112a in the case that 112a is a radially inward arcing radius. It is to be appreciated that the corners 116a and 116b and inner slot surface 112a are radially spaced from relatively high temperatures of the core flowpath C. The radii 116a, 116b, and 112a (in the case that 112a is a radially inward arcing radius) may be chosen such that the thermomechanical fatigue is spread equally between each of these radii, yielding an optimal solution.

A seal assembly 120 (FIGS. 4 and 6) blocks flow from moving radially inward from the core flowpath C into the first area 104 of the slots 100. In this example, the positioning of the seal assembly 120 permits flow from the core flowpath C throughout the second area 108. The seal assembly 120 also blocks flow from the core flowpath C from moving through gaps between the forward hub 68, the aft hub 72, and the integrally bladed rotor 76.

The seal assembly 120 is a ladder seal having a plurality of axially skewed fingers 124 extending axially from a radially extending, annular flange 128. The fingers 124 are circumferentially spaced from each other and connected by the flange 128. In an installed position, the radially extending flange 128 contacts the forward hub 68, and is circumferentially continuous about the engine axis A. For reference, the radial direction is the thickness of the seal 120 in FIG. 5, the circumferential direction is the width of the seal 120 in FIG. 5, and the axial direction is into or out of the page in FIG. 5.

Generally, the platforms 96 form the radially inner boundary of the core flowpath C in this area of the engine 20. However, at the second area 108, the seal assembly 120 forms the radially inner boundary of the core flowpath. That is, the second area 108 forms a portion of the core flowpath C.

Figure 8:
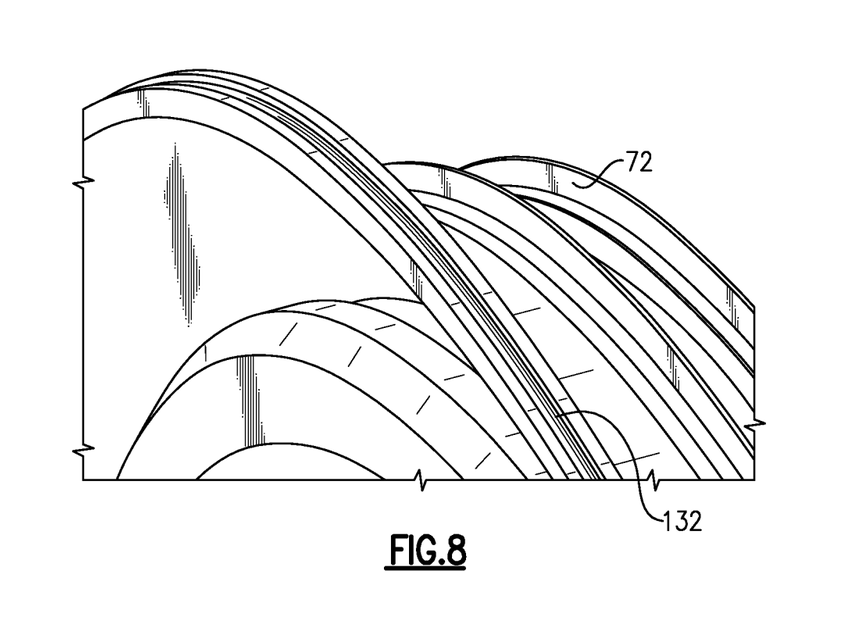
FIG. 8 illustrates a perspective view of an aft hub of the assembly of FIG. 2.

In this example, each of the fingers 124 is received within a respective one of the slots 100. The fingers 124 extend through the slots 100 to interface with the aft hub 72 and specifically to interface with a wire seal 132 of the aft hub 72. The wire seal 132 is held within a circumferentially extending groove 134. In this example, the fingers 124 extend from the flange 128 in a direction having both an axial and a circumferential component.

During operation, centrifugal forces force the fingers 124 radially outward against the undersides of the platforms 96. These centrifugal forces also cause the wire seal 132 to be forced radially outward against the undersides of the seal fingers 124 as well as the undersides of the platforms 96 in between the seal fingers 124.

The integrally bladed rotor 76 experiences hoop (annular) stresses within the radially inner hoop 80, which is radially spaced further from the core flowpath C than the integrally bladed rotors of the prior art. This allows tuning for these, and other, stresses in a relatively lower temperature, and lower stress, environment than the prior art. The seal assembly 120 prevents relatively high temperature flow from moving near the radially inner hoop 80.

Utilizing an integrally bladed rotor rather than a rotor having a separate blade may require less material, which can desirably reduce weight and cost.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. An integrally bladed rotor for a gas turbine engine, comprising:
    a radially inner hoop extending circumferentially about an axis;
    a plurality of circumferentially spaced, axially extending slots, separated by respective blade supports;
    a seal system that includes seal fingers extending axially through the slots, wherein the seal system is an annular ladder seal; and
    wherein the seal fingers are configured to contact an annular wire seal.

2. The integrally bladed rotor of claim 1, wherein the radially inner hoop is circumferentially continuous about the axis.

3. The integrally bladed rotor of claim 1, including a radially extending flange of the seal system to contact a hub of the gas turbine engine.

4. The integrally bladed rotor of claim 1, wherein the slots have a keyhole profile.

5. The integrally bladed rotor of claim 1, wherein the slots include a first area near the axis and second area extending radially outward from the first area, the first area being circumferentially enlarged relative to the second area, the seal fingers disposed within the slot exclusively within the first area.

6. The integrally bladed rotor of claim 5, wherein the first area has a rounded profile and the second area has a polygonal profile.

7. The integrally bladed rotor of claim 5, wherein the second area is a keyhole opening.

8. The integrally bladed rotor of claim 7, comprising:
    a radially extending flange of the seal system to contact a hub of the gas turbine engine;
    wherein the radially inner hoop is circumferentially continuous about the axis;
    wherein the slots have a keyhole profile; and
    wherein the seal fingers are spaced apart from radially innermost surfaces of the slots.

9. The integrally bladed rotor of claim 8, wherein the integrally bladed rotor is a high pressure compressor rotor.

10. The integrally bladed rotor of claim 1, wherein radially inner surfaces of the plurality of slots have a radially inward arcing radius that at least partially defines an outer radius of the radially inner hoop, the radially inward arcing radius to distribute thermomechanical fatigue between the radially inner surfaces and tangent corner transition radii.

11. A gas turbine engine assembly having an integrally bladed rotor, the integrally bladed rotor comprising:
    a radially inner hoop extending circumferentially about an axis;
    a plurality of circumferentially spaced, axially extending slots, separated by respective blade supports;
    a ladder seal having a portion disposed within more than one of the plurality of slots;
    wherein the ladder seal has a plurality of fingers each extending axially through a circumferentially enlarged area of one of the plurality of slots; and
    a radially extending flange to connect one end of the plurality of fingers, the radially extending flange contacting a first hub of the gas turbine engine that is upstream from the integrally bladed rotor relative to a direction of flow through the gas turbine engine.

12. The gas turbine engine assembly of claim 11, wherein the integrally bladed rotor is positioned at an aftmost stage of a compressor section.

13. The gas turbine engine assembly of claim 11, wherein the integrally bladed rotor is within a geared gas turbine engine.

14. The gas turbine engine assembly of claim 11, comprising an annular wire seal held by a second hub that is downstream from the integrally bladed rotor relative to the direction of flow through the gas turbine engine, wherein ends of the plurality of fingers that are opposite the radially extending flange contacting the annular wire seal.

15. The integrally bladed rotor of claim 14, comprising:
    a fan including a plurality of fan blades;
    a compressor section including a first compressor and a second compressor;
    a turbine section including a first turbine and a second turbine, the first turbine driving the fan through a geared architecture at a lower speed than the first turbine;
    wherein the integrally bladed rotor is positioned at a stage of the compressor section; and
    wherein the integrally bladed rotor, the first hub and the second hub are separate and distinct.

16. The integrally bladed rotor of claim 15, wherein the slots have a keyhole profile, the slots include a first area near the axis and second area extending radially outward from the first area, the first area being circumferentially enlarged relative to the second area, and the seal positioned within the circumferentially enlarged area such that the plurality of fingers are spaced apart from radially innermost surfaces of the slots.

17. The gas turbine engine assembly of claim 11, wherein the slots have a keyhole profile.

18. The gas turbine engine assembly of claim 17, wherein the slots include a first area near the axis and second area extending radially outward from the first area, the first area being circumferentially enlarged relative to the second area, the seal positioned within the circumferentially enlarged area.

19. The gas turbine engine assembly of claim 11, wherein the first hub extends from a first rotor that is upstream from the integrally bladed rotor relative to the direction of flow through the gas turbine engine.

20. A method of manufacturing an integrally bladed rotor, comprising:

providing a radially inner hoop extending circumferentially about an axis, and a plurality of circumferentially spaced, axially extending slots, separating respective blade supports;

sealing more than one of the slots using a single seal; and wherein the single seal is an annular ladder seal including seal fingers, and the step of sealing includes positioning each of the seal fingers to extend axially through a respective one of the slots and contact an annular wire seal.

21. The method of claim 20, wherein the slots are keyhole slots comprising a keyhole opening.

* * * * *